(12) United States Patent
Croak et al.

(10) Patent No.: US 7,738,446 B1
(45) Date of Patent: Jun. 15, 2010

(54) METHOD AND APPARATUS FOR DETERMINING USAGE OF DIGITAL SIGNAL PROCESSING RESOURCES

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 217 days.

(21) Appl. No.: 11/290,404

(22) Filed: Nov. 30, 2005

(51) Int. Cl.
*H04L 12/66* (2006.01)
(52) U.S. Cl. ..................... 370/352; 370/353
(58) Field of Classification Search ......... 370/352–354; 379/219, 201.12, 201.02; 709/1, 10
See application file for complete search history.

(56) References Cited

U.S. PATENT DOCUMENTS

| | | | | |
|---|---|---|---|---|
| 6,141,345 A | * | 10/2000 | Goeddel et al. | 370/389 |
| 6,181,694 B1 | * | 1/2001 | Pickett | 370/353 |
| 7,206,825 B1 | * | 4/2007 | Sauriol et al. | 709/220 |
| 2004/0064558 A1 | * | 4/2004 | Miyake | 709/226 |

* cited by examiner

*Primary Examiner*—Suhan Ni

(57) ABSTRACT

A method and apparatus for providing service providers with a method for determining the best usage of the DSP resources are disclosed. In one embodiment, a network map of DSP resources is also presented so that a service provider may determine whether to use regional DSP resources that are located geographically closer to the edge network elements in a network or to use centralized DSP resources that are located geographically more distant.

3 Claims, 5 Drawing Sheets

METHOD AND APPARATUS FOR DETERMINING USAGE OF DIGITAL SIGNAL PROCESSING RESOURCES

The present invention relates generally to communication networks and, more particularly, to a method and apparatus for providing a network map of Digital Signal Processing (DSP) resources in communication networks, e.g., packet networks such as Voice over Internet Protocol (VoIP) networks.

BACKGROUND OF THE INVENTION

Digital Signaling Processing (DSP) equipment and components are valuable assets required to facilitate various aspects of voice communication in a network. For instance, DSP resources are required to provide different codec support and Dual Tone Multiple Frequency (DTMF) recognition for packetized voice communications. For business and consumer customers alike, DSP resources can reside locally within the customer premise equipment (CPE) or be more centralized within a network facility. DSP resources within the network can also be distributed along the edge of the network to serve as regional resources or hosted in a more centralized site for shared usage across the network to support many access points. However, there is no tool to assists a service provider or its customer in determining which DSP resources to use or the locations of the DSP resources.

Therefore, a need exists for a method and apparatus for providing a network map of Digital Signal Processing (DSP) resources in a packet network, e.g., a VoIP network.

SUMMARY OF THE INVENTION

In one embodiment, a method and apparatus for providing service providers with a method for determining the best usage of the DSP resources are disclosed. For example, regional DSP resources require less network bandwidth and transport costs but have higher DSP usage costs and centralized DSP resources have reduced DSP usage costs but require more bandwidth and transport costs. In one embodiment, a network map of DSP resources is also presented so that a service provider may determine whether to use regional DSP resources that are located geographically closer to the edge network elements in a network or to use centralized DSP resources that are located geographically more distant.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
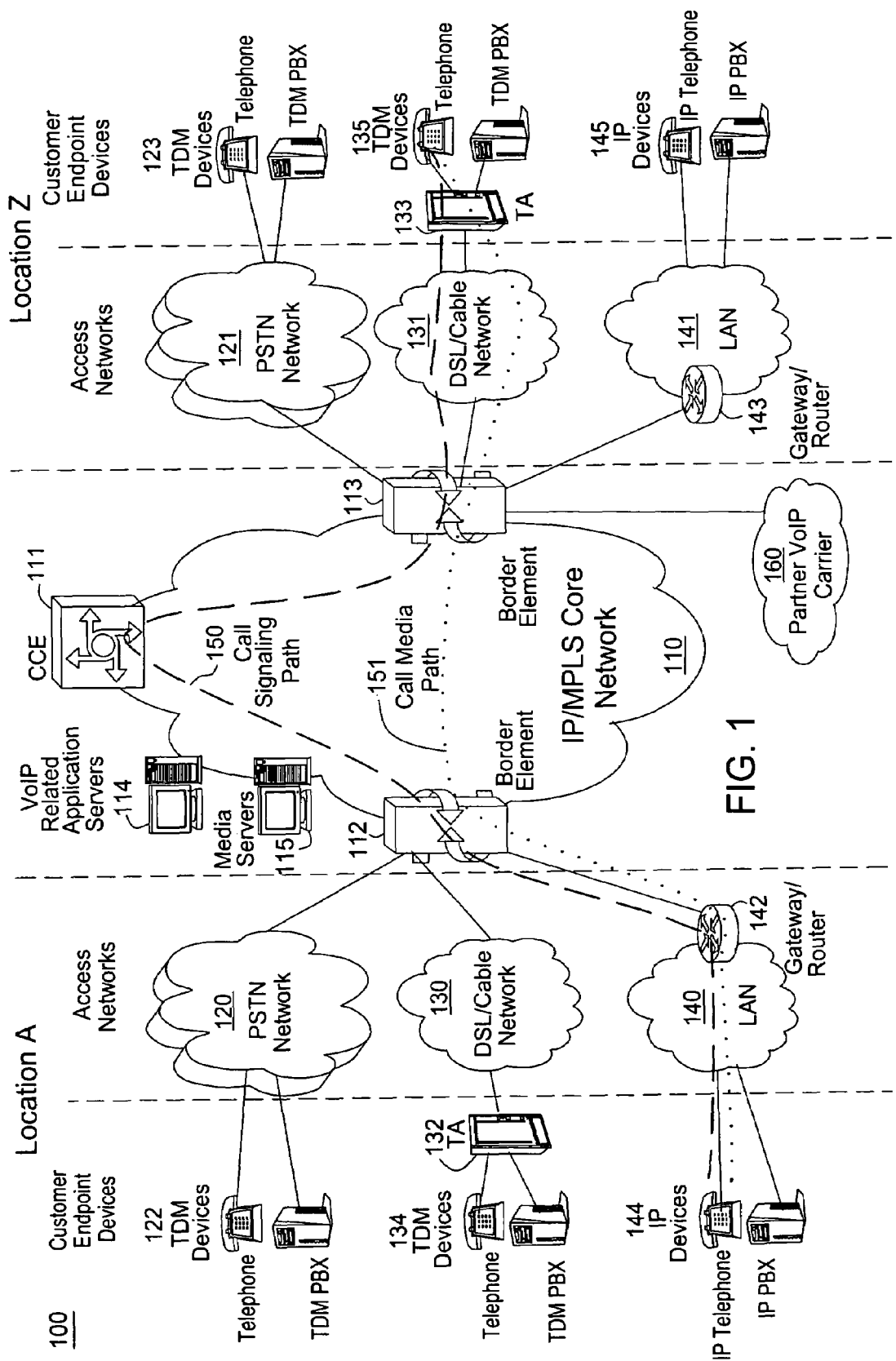
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include Internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Digital Signaling Processing (DSP) equipment and components are valuable assets required to facilitate various aspects of voice communication in a network. For instance, DSP resources are required to provide different codec support and Dual Tone Multiple Frequency (DTMF) recognition for packetized voice communications. For business and consumer customers alike, DSP resources can reside locally within the customer premise equipment (CPE) or be more centralized within a network facility. DSP resources within the network can also be distributed along the edge of the network to serve as regional resources or hosted in a more centralized site for shared usage across the network to support many access points. Most network providers tend to have a hybrid arrangement supporting both regionalized and centralized DSP equipment and components.

To address this need, the present invention provides service providers with a network map of DSP resources so they can determine whether to use regional DSP resources that are located geographically closer to the edge network elements in a network or to use centralized DSP resources that are located geographically more distant. Regional DSP resources require less network bandwidth and transport costs but have higher DSP usage costs and centralized DSP resources have reduced DSP usage costs but require more bandwidth and transport costs. In one embodiment, a method is also provided to assist these service providers to determine the best arrangements of the DSP resources.

Figure 2:
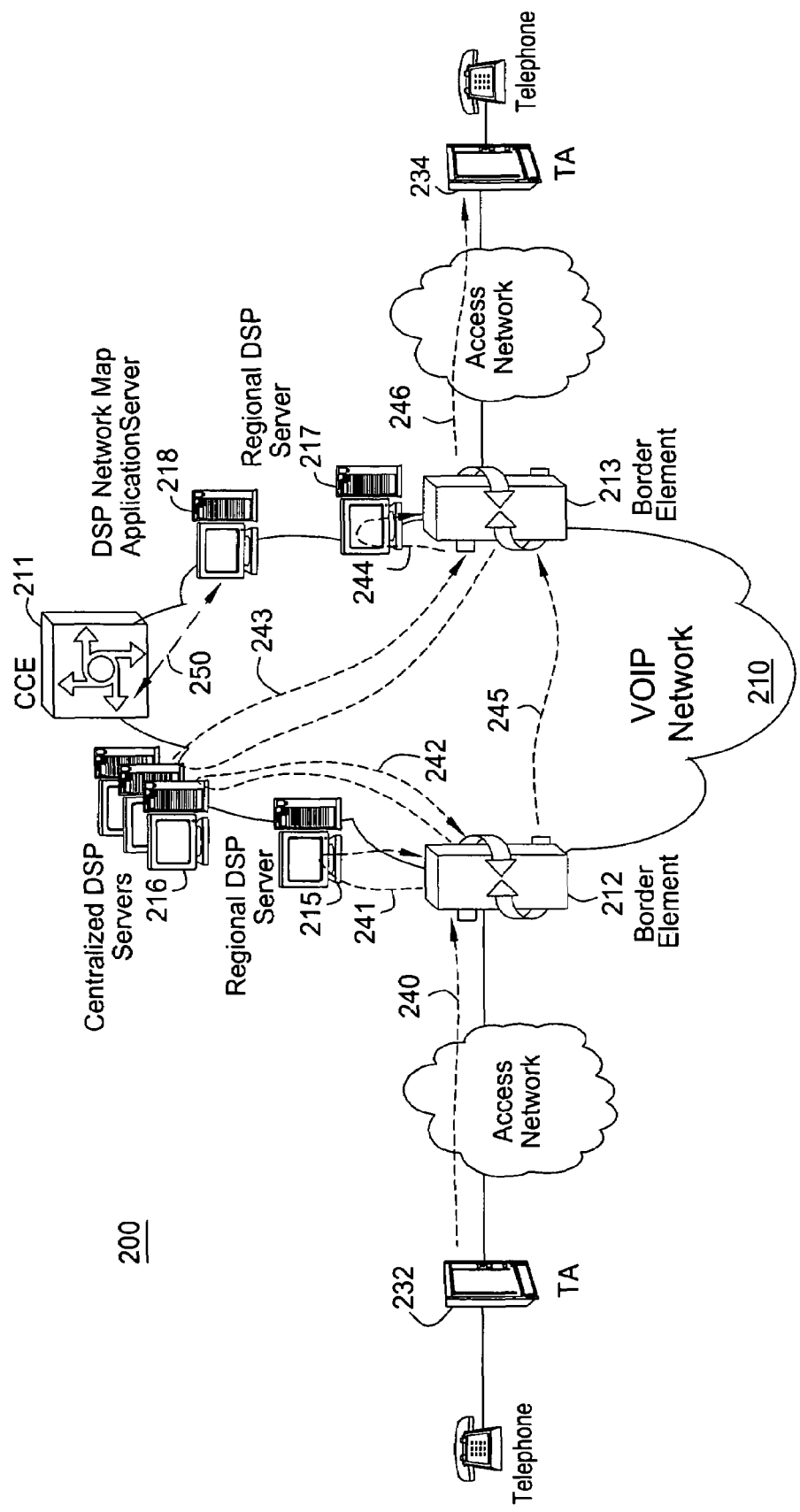
FIG. 2 illustrates an example of providing a network map of Digital Signal Processing (DSP) resources in a VoIP network of the present invention.

FIG. 2 illustrates an example 200 of providing a network map of Digital Signal Processing (DSP) resources in a packet network, e.g., a VoIP network of the present invention. In FIG. 2, a subscriber equipped with TA 232 makes a call to a called party endpoint, TA 234, a call setup message is sent to CCE 211. Upon processing the call setup message, CCE 211 finds out that the call requires the use of DSP resources available in VoIP network 210 to perform transcoding functions, e.g., converting voice format carried in a call media path from G.711 format to G.729 format. CCE 211 has the choice to route the call media path via regional DSP Server 215 and DSP Server 217 or centralized DSP Servers 216.

If Regional DSP Server 215 and Regional DSP Server 217 are used to support a call media path, the call media will comprise call media path segments 240, 241, 245, 244, and 246 in that order. The use of Regional DSP Server 215 and Regional DSP Server 217 incur a higher unit usage cost in terms of DSP resources since regionalized DSP resources tend to have higher unit costs but the network transport costs of call media path segments 241 and 244 incur a lower unit network transport cost since media path segments 241 and 244 tend to be shorter in physical distance.

If regional DSP Servers 216 are used to support a call media path, the call media path will comprise call media path segments 240, 242, 245, 243, and 246 in that order. The use of centralized DSP Servers 216 incurs a lower unit usage cost in terms of DSP resources since centralized DSP resources tend to have lower unit costs but the network transport costs of call media path segments 242 and 243 incur a higher unit network transport cost since media path segments 242 and 243 tend to be longer in physical distance.

If overall costs of using regionalized DSP resources, such as Regional DSP Server 215 and Regional DSP Server 217, are higher than the costs of using centralized DSP resources, such as Centralized DSP Servers 216, then the regionalized DSP resources will be used; otherwise, the centralized DSP resources will be used. The overall costs are determined by two components. One component is the unit cost of using the DSP resources. Regionalized DSP resources have a higher unit cost than centralized DSP resources in terms of DSP resources. Another component is the unit cost of using the network transport resources to access the DSP resources. This network transport component cost is both time and distance sensitive. For instance, the longer the call media path segment between a BE and a DSP server, the higher the unit network transport costs. The overall costs of using DSP resources is the sum of the DSP resource usage unit cost component and the network transport unit cost component.

Since CCE 211 determines both the originating BE, such as BE 212, and the terminating BE, such as BE 213, that will be used to support a call media path, CCE 211 communicates with DSP Network Map AS 218 using flow 250 by providing the originating and the termination BE information to determine which sets of DSP resources are to be used to establish a call media path. DSP Network Map AS 218 comprises information relating to all regionalized and centralized DSP resources in VoIP network 210 as well as the DSP usage and network transport unit cost information. DSP Network Map AS 218 compares the overall costs of various available options of using different combinations of regionalized or centralized DSP resources and returns the DSP servers that incur the lowest overall DSP costs to CCE 211 using flow 250.

Once CCE 211 receives the DSP servers that incur the lowest overall DSP costs associated with the originating BE and the terminating BE, CCE 211 establishes the call media path to include the received DSP servers provided by DSP Network Map AS 218.

Figure 3:
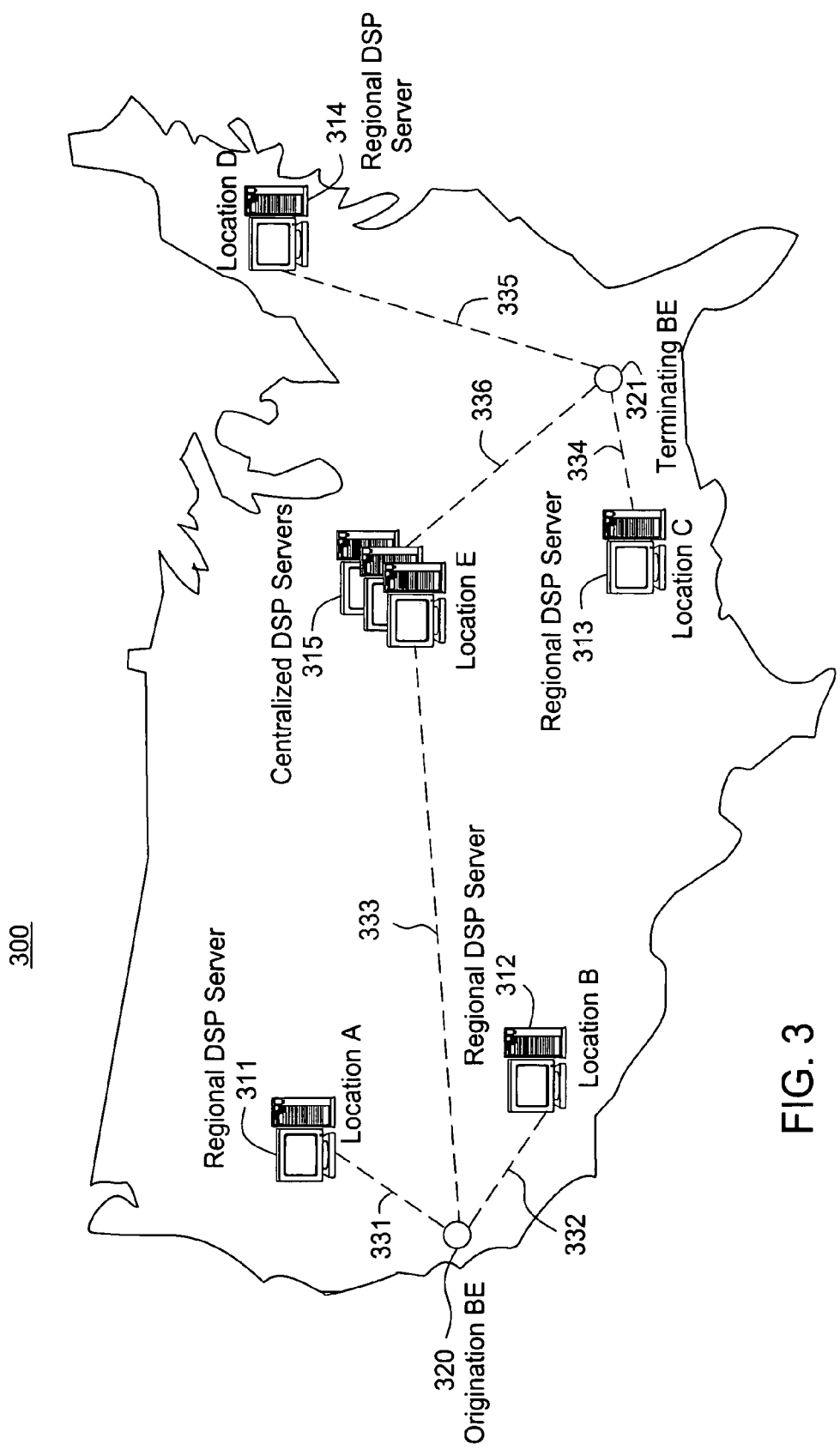
FIG. 3 illustrates an exemplary map display of Digital Signal Processing (DSP) resources in a packet network, e.g., a VoIP network, of the present invention.

FIG. 3 illustrates an exemplary Digital Signal Processing (DSP) resources network map 300 in a packet network, e.g., a VoIP network, of the present invention. In FIG. 3, a geographical network, such as VoIP network 210, is populated with regional and centralized DSP servers at different locations. For instance, regional DSP server 311 is available at location A, regional DSP server 312 is available at location B, regional DSP server 313 is available at location C, regional DSP server 314 is available at location D, and centralized DSP servers 315 are available at location E as shown in Digital Signal Processing (DSP) resources network map 300.

Through a DSP Network Map AS, CCE 211 can provide the information of the originating BE, e.g., BE 320, and the terminating BE, e.g., BE 321, to be used to establish a call media path and the DSP Network Map AS can calculate the lowest overall DSP costs option by comparing the costs of using different DSP resource combinations. For example, DSP Network Map AS calculates the different options and associated overall DSP costs for BE 320. BE 320 can use regional DSP server 311, regional DSP server 312, or centralized DSP sever 315 via call media path segments 331, 332, and 333 respectively for cost comparison purposes. DSP Network Map AS then identifies the DSP server that incurs the lowest overall costs to be used to support a particular call.

Similarly, DSP Network Map AS calculates the different options and associated overall DSP costs for BE 321. BE 321 can use regional DSP server 313, regional DSP server 314, or centralized DSP servers 315 via call media path segments 334, 336, and 335 respectively for cost comparison purposes. DSP Network Map AS then identifies the DSP server that incurs the lowest overall costs to be used to support a particular call.

Once a DSP server associated with BE 320 that incurs the lowest overall DSP costs and a DSP server associated with BE 321 that incurs the lowest overall DSP costs are identified by DSP Network Map AS, DSP Network Map AS returns the identified information to a CCE for call completion.

Figure 4:
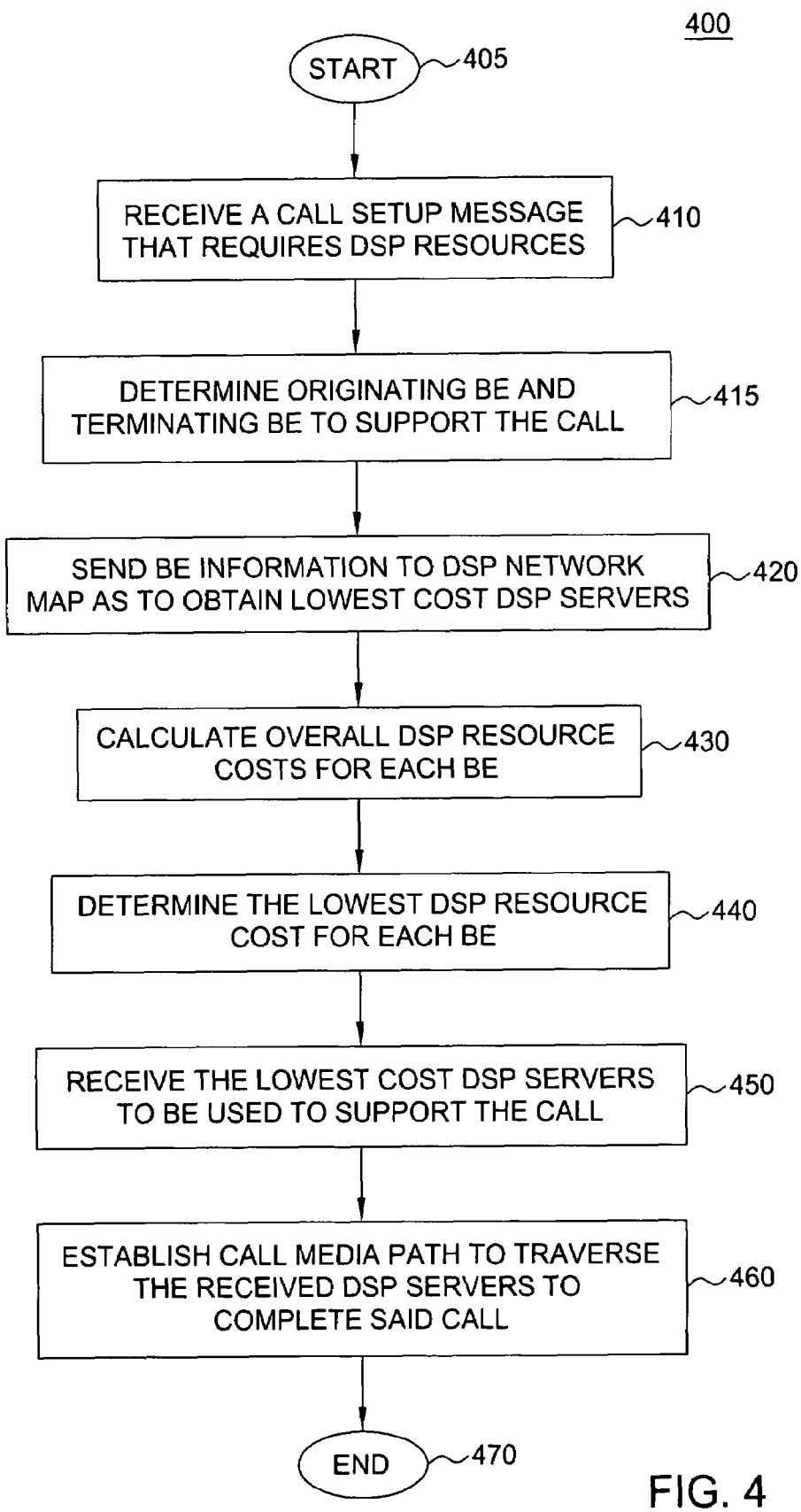
FIG. 4 illustrates a flowchart of a method for providing a network map of Digital Signal Processing (DSP) resources in a packet network, e.g., a VoIP network, of the present invention.

FIG. 4 illustrates a flowchart of an exemplary method 400 for determining usage of Digital Signal Processing (DSP) resources in a packet network, e.g., a VoIP network, of the present invention. Method 400 starts in step 405 and proceeds to step 410.

In step 410, the method receives a call setup message that requires the use of DSP resources to support the call. The DSP resources can be used for transcoding, Dual Tone Multiple Frequency (DTMF) recognition, or voice recognition to support the call. For example, the call setup message is received by a CCE.

In step 415, the method determines the originating BE and the terminating BE that are to be used to support the call. The originating BE and the terminating BE are determined by the CCE.

In step 420, the method sends the determined originating BE and the terminating BE information to a DSP Network Map AS to obtain the lowest cost DSP servers to support the call. For example, the BE information is sent by the CCE.

In step 430, the method calculates the overall DSP costs to use different DSP servers, regionalized or centralized DSP servers, associated with each of the BE. For example, the cost calculation is performed by the DSP Network Map AS.

In step 440, the method determines a DSP server that incur the lowest overall DSP costs for each of the BE through comparisons. The DSP server that incur the lowest overall DSP costs for each of the BE is determined by the DSP Network Map AS.

In step 450, the method receives the DSP servers associated with the originating BE and the terminating BE that incur the lowest overall DSP costs. The DSP server information is received by the CCE.

In step 460, the method uses the received DSP servers associated with the originating BE and the terminating BE to setup a call media path that traverses these DSP servers. The method ends in step 470.

Figure 5:
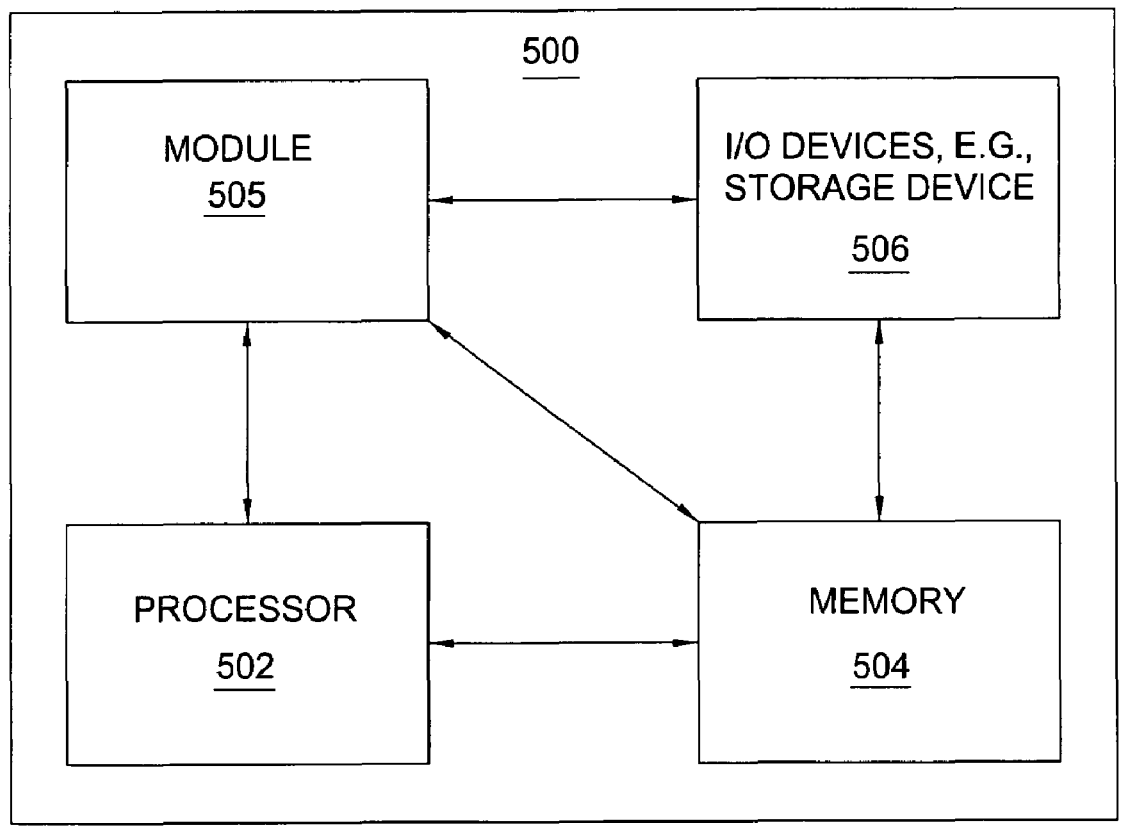
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a network map of DSP resources, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a network map of DSP resources can be loaded into memory 504 and executed by processor 502 to implement the functions as discussed above. As such, the present module or process 505 for providing a network map of DSP resources (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a usage of Digital Signal Processing (DSP) resources in a communication network, comprising:

receiving at a Call Control Element (CCE) a call setup message to setup a call;

determining at least one DSP server from a plurality of DSP servers that incurs a lowest overall DSP cost for supporting said call, wherein said plurality of DSP servers is deployed within said communication network, wherein said determining comprises:

determining an originating border element (BE) and a terminating BE to be used to support said call;

identifying a plurality of overall DSP costs of using various available DSP servers associated with said originating BE and said terminating BE; and determining said at least one DSP server that incurs said lowest overall DSP cost associated with said originating BE and said terminating BE, wherein said at least one DSP server that incurs the lowest overall DSP cost associated with said originating BE and said terminating BE is determined by a DSP Network Map Application Server, wherein said originating BE and said terminating BE are provided by said Call Control Element (CCE) to said DSP Network Map Application Server to determine said at least one DSP server that incurs said lowest overall DSP cost associated with said originating BE and said terminating BE; and establishing by said CCE said call using said at least one DSP server.

2. A computer-readable medium having stored thereon a plurality of instructions, the plurality of instructions including instructions which, when executed by a processor, cause the processor to perform steps of a method for determining a usage of Digital Signal Processing (DSP) resources in a communication network, comprising:

receiving a call setup message to setup a call;

determining at least one DSP server from a plurality of DSP servers that incurs a lowest overall DSP cost for supporting said call, wherein said plurality of DSP servers is deployed within said communication network, wherein said determining comprises:

determining an originating border element (BE) and a terminating BE to be used to support said call;

identifying a plurality of overall DSP costs of using various available DSP servers associated with said originating BE and said terminating BE; and determining said at least one DSP server that incurs said lowest overall DSP cost associated with said originating BE and said terminating BE, wherein said at least one DSP server that incurs the lowest overall DSP cost associated with said originating BE and said terminating BE is determined by a DSP Network Map Application Server, wherein said originating BE and said terminating BE are provided by a Call Control Element (CCE) to said DSP Network Map Application Server to determine said at least one DSP server that incurs said lowest overall DSP cost associated with said originating BE and said terminating BE; and establishing said call using said at least one DSP server.

3. An apparatus for determining a usage of Digital Signal Processing (DSP) resources in a communication network, comprising:

means for receiving a call setup message to setup a call;

means for determining at least one DSP server from a plurality of DSP servers that incurs a lowest overall DSP cost for supporting said call, wherein said plurality of DSP servers is deployed within said communication network, wherein said means for determining comprises:

means for determining an originating border element (BE) and a terminating BE to be used to support said call;

means for identifying a plurality of overall DSP costs of using various available DSP servers associated with said originating BE and said terminating BE; and a DSP Network Map Application Server for determining said at least one DSP server that incurs said lowest overall DSP cost associated with said originating BE and said terminating BE, wherein said originating BE and said terminating BE are provided by a Call Control Element (CCE) to said DSP Network Map Application Server to determine said at least one DSP server that incurs said lowest overall DSP cost associated with said originating BE and said terminating BE; and means for establishing said call using said at least one DSP server.

* * * * *